(12) United States Patent
Westerman (10) Patent No.: US 6,404,443 B1
(45) Date of Patent: Jun. 11, 2002

(54) THREE-DIMENSIONAL GRAPHICAL USER INTERFACE FOR MANAGING SCREEN OBJECTS

(75) Inventor: Larry Alan Westerman, Portland, OR (US)

(73) Assignee: Sharp Laboratories of America, Camas, WA (US)

( * ) Notice: Subject to any disclaimer, the term of this patent is extended or adjusted under 35 U.S.C. 154(b) by 0 days.

(21) Appl. No.: 09/383,040

(22) Filed: Aug. 25, 1999

(51) Int. Cl.⁷ .................................................. G09G 5/00
(52) U.S. Cl. ..................... 345/776; 345/851; 345/777
(58) Field of Search .................... 345/776, 777, 345/775, 848–852, 782, 653, 664, 679, 828–829, 839, 860, 763, 826; 707/10, 9, 230

(56) References Cited

U.S. PATENT DOCUMENTS

| | | | |
|---|---|---|---|
| 4,555,775 A | | 11/1985 | Pike |
| 4,688,167 A | | 8/1987 | Agarwal |
| 5,060,135 A | * | 10/1991 | Levine et al. ............... 345/777 |
| 5,289,574 A | | 2/1994 | Sawyer |
| 5,293,529 A | | 3/1994 | Yoshimura et al. |
| 5,339,390 A | | 8/1994 | Robertson et al. |
| 5,347,628 A | * | 9/1994 | Brewer et al. ............... 345/850 |
| 5,442,795 A | * | 8/1995 | Levine et al. ............... 345/777 |
| 5,469,540 A | | 11/1995 | Powers, III et al. |
| 5,561,757 A | | 10/1996 | Southgate |
| 5,583,984 A | | 12/1996 | Conrad et al. |
| 5,600,346 A | | 2/1997 | Katamata et al. |
| 5,651,107 A | | 7/1997 | Frank et al. |
| 5,668,962 A | | 9/1997 | Kitami |
| 5,689,666 A | | 11/1997 | Berquist et al. |
| 5,774,122 A | * | 6/1998 | Kojima et al. ............... 345/763 |
| 5,808,614 A | * | 9/1998 | Nasahara et al. ........... 345/775 |
| 5,838,326 A | * | 11/1998 | Card et al. .................... 345/776 |
| 5,847,709 A | * | 12/1998 | Card et al. .................... 345/776 |
| 5,986,662 A | * | 11/1999 | Argiro et al. ................ 345/424 |

* cited by examiner

Primary Examiner—Steven Sax
(74) Attorney, Agent, or Firm—Marger Johnson & McCollom, PC (57) ABSTRACT

A user interface is provided for handling a group of screen objects. The interface establishes a viewport in a portion of the screen. The interface allows the user to define a set of planes, and to assign each object to one of the planes. A tab identifying each plane is always visible, and is used to select one plane at a time. The objects of the selected plane are thus displayed through the viewport, and available for handling as is known. The planes are stacked in a sequence, which is reflected in the order of the tabs. Also viewable in the viewport the objects of the next plane in the sequence but can not be worked upon. Navigation thus creates a sense of moving perpendicularly to the screen, which banks on the user's preconceived sense of depth.

37 Claims, 5 Drawing Sheets

THREE-DIMENSIONAL GRAPHICAL USER INTERFACE FOR MANAGING SCREEN OBJECTS

BACKGROUND OF THE INVENTION

1. Field of the Invention

The present invention relates to apparatus and methods for displaying information graphically, and more particularly, the present invention relates to a computer controlled display system for managing and displaying screen objects on a computer screen.

2. Description of the Related Art

Over the past decade, a variety of graphic user interfaces have been developed to ease human interaction with computer systems. Many user interfaces use metaphors for the design of the interface as a way of maximizing human familiarity, and for conveying additional information between the user and computer without stating the information explicitly. Through the use of familiar metaphors, such as desktops, notebooks and the like, the interface takes advantage of existing human mental associations, to permit a user to draw upon the metaphor for understanding the requirements of the particular computer system, by analogy. It is well known that designing a new system around a familiar metaphor helps reduce human learning time.

In current generation systems, two metaphors are used in combination. First, programs or data files etc., are called objects, and are each displayed as a screen object, such as an icon. Second, a system of multiple windows is used to manage the icons for displaying and operating on them. The result is a so-called "object oriented" display system.

More specifically, visually distinct display objects are provided on the display screen, and are commonly referred to as "icons". Each of the icons represents a function or object on the desktop. A user operates on the object by graphically operating on the icon. Accordingly, even non-expert users need fewer instructions.

Additionally, multiple "windows" combine text and graphics. The windows are used to classify the objects in groups, according to the user's choice. Using a desk top metaphor, the windows may take the form of a variety of objects, such a file folders, loose leaf binders, or simple rectangles. The windows may overlap one another, with the "top" window constituting the current work file.

In many systems, a cursor is also displayed on the screen, which serves as a pointer. The cursor may be selectively moved in response to the movement of a mouse or other pointer control device. The cursor may be moved over display objects which the user may select on the screen. The user may delete information from a window, move data from one window to another, and generally operate on the windows as if an actual file or other physical object is being manipulated. A variety of "pull-down" menus also may be displayed, using a technique for selecting particular command options appearing along a menu bar, and subcommand items corresponding to the command options.

As computers increase in memory and processing power, so does the ability to hold many programs and perform many tasks at once. While this is desirable to increase productivity, more programs mean more screen objects. Running them simultaneously requires increasing screen space, to have many windows open at once.

A solution to the increasing need for screen space has been to use "virtual" windows or workspaces, that is windows that extend past the area (or "viewpoint") that the screen can present. These are brought into view by manipulating the viewpoint with respect to the workspace.

The very success of this solution is also its shortcoming. Technically, it permits making the workspace of infinite surface dimension, which thus can handle a very large number of screen objects. However, as the total area becomes larger and larger, the user increasingly loses the bigger picture of what other screen objects are active, and where they are. Worse, when he needs a specific one, he might not know towards which direction of the extended workspace to search, by bringing the viewpoint there. Searching then resembles a random walk in a two-dimensional field.

To address this problem, a mapping solution is taught by U.S. Pat. No. 5,339,390. It displays the currently selected original screen space in normal size and perspective, but in a reduced portion of the screen. In the flanks it displays a condensed, reduced, and thus also distorted version of objects in the virtual space. While this preserves the bigger picture and facilitates searching, the more virtual space it covers, the more it reduces the screen portion for the original display, and the more it diminishes the size of the screen objects in the flanks.

BRIEF SUMMARY OF THE INVENTION

The present invention overcomes these problems and limitations of the prior art.

Generally, the present invention provides a user interface and methods for managing a group of screen objects.

The interface of the invention establishes a viewport in a portion of the screen. The interface includes a set of planes, and each screen object is assigned to one of the planes. A tab identifying each plane is always visible, and is used to select one plane at a time, for viewing at the viewport. The objects of the selected plane are thus displayed and available for handling as is known.

The objects can be moved between planes. In addition, new planes can be created and old planes can be deleted. Moreover, the planes are presented as stacked in a sequence, which is reflected in the order of the tabs. The sequence can also be changed.

Optionally and preferably, in addition to the objects of the selected plane, there are also viewable in the viewport the objects of the next plane in the sequence. The objects of the next plane are seen less prominently, possibly obscured by those of the selected plane, and can not be worked upon. Accordingly, when the user navigates by selecting a next plane in the sequence, some objects are maintained on the screen, but their appearance and availability is changed. This creates a sense of moving perpendicularly to the screen, which creates a sense of depth, while not requiring virtual windows that extend outside the viewport.

There can be a very large number of planes, which can accommodate a very large number of screen objects. The user can quickly view the entire interface by successively clicking on the tabs, thereby changing planes. Searching is a linear procedure, which goes through planes. Since the planes are in a sequence, navigation between them thus becomes more intuitive, by capitalizing on the user's already established sense of depth as a third dimension.

The foregoing and other objects, features and advantages of the invention will become more readily apparent from the following detailed description of a preferred embodiment, which proceeds with reference to the drawings.

DETAILED DESCRIPTION OF THE PREFERRED EMBODIMENT(S)

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Further, special purpose machines such as personal organizers can embody the present invention.

Figure 1:
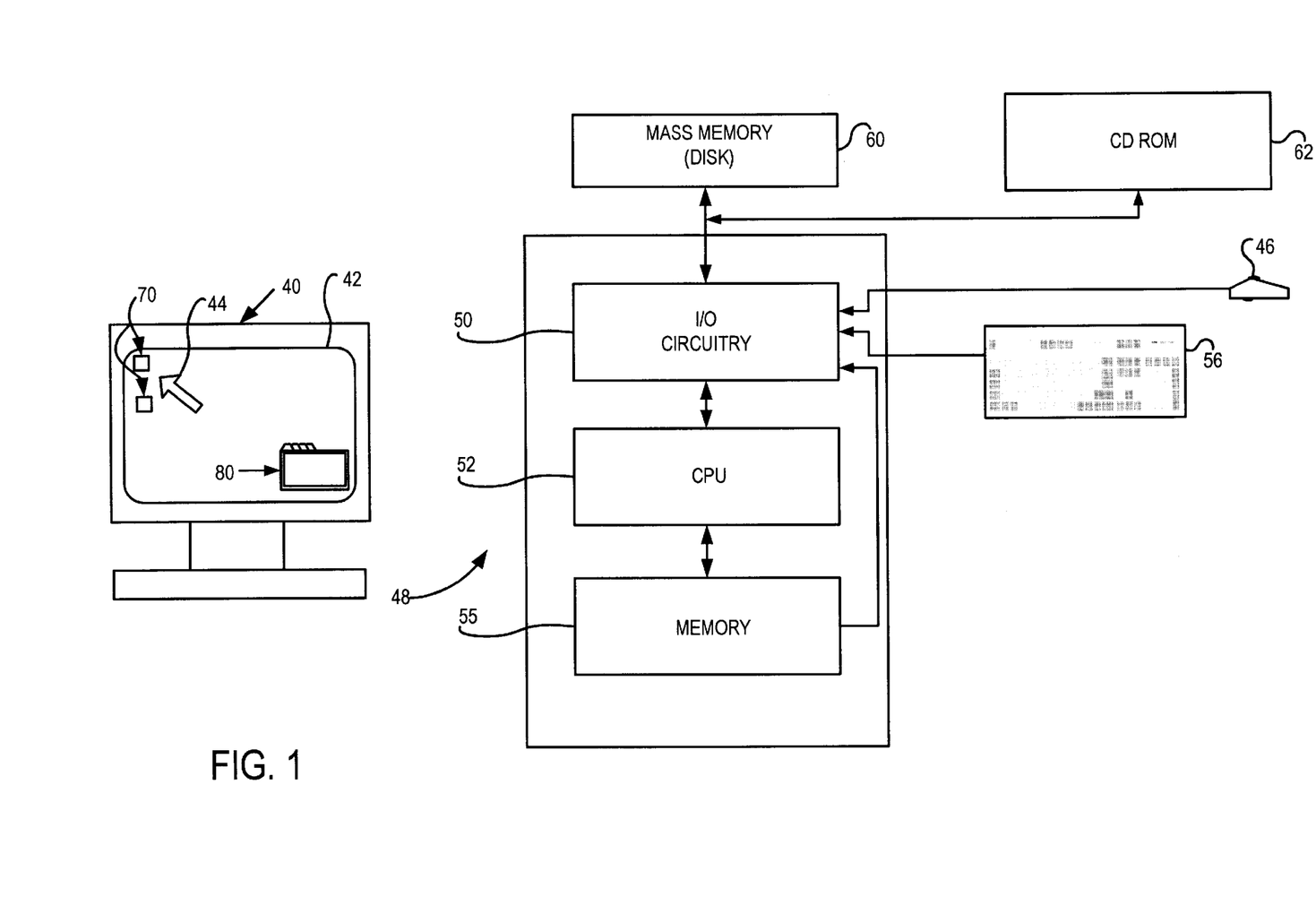
FIG. 1 is a functional block diagram illustrating one possible computer display system incorporating the teachings of the present invention.

The computer controlled display system of the present invention is part of a computer system, such as that illustrated in FIG. 1. The computer controlled display system includes a display means 40, such as a CRT monitor or a liquid crystal display (LCD).

The display means 40 has a display screen 42. All of the area of screen 42 can be used for display. On screen 42 there is displayed a cursor 44 that is controlled by the user.

The display system further includes a cursor control means 46 for controlling the position of cursor 44 on display screen 42. The cursor control means is preferably a computer mouse 46, although it can be any one of a track ball, joy stick, graphic tablet, or other device such as a graphical input device that controls the position of the cursor.

The cursor control means is coupled with a computer system 48, as is also display means 40. Typically, cursor control means 46 includes a signal generation means, such as a switch having a first position and a second position. For example, a typical mouse has at least one button that the user can click. The signal generation means is used for generating signals directing the computer system to execute certain commands.

The computer 48 includes three major components. The first of these is an input/output (I/O) circuit 50, which is used to communicate information in appropriately structured form to and from other portions of computer system 48. In addition, computer system 48 includes a central processing unit (CPU) 52, coupled to the I/O circuit 50 and to a memory 55. These elements are those typically found in most general purpose computers, and in fact, computer 48 is intended to be representative of a broad category of data processing devices capable of generating graphic displays.

Also shown in FIG. 1 is a keyboard 56 to input data and commands into computer system 48, as is well known in the art. A magnetic mass memory disk 60 is shown coupled to I/O circuit 50 to provide additional storage capability for computer system 48. In addition, a CD ROM 62 is further coupled to the I/O circuit 50 for additional storage capacity. It will be appreciated that additional devices may be coupled to computer system 48 for storing data, such as magnetic tape drives, as well as networks, which are in turn coupled to other data processing systems.

On the full screen area of display screen 42 there are shown various screen objects 70, made as is known. In addition, an object 80 is displayed, made from a graphical user interface of the invention.

Figure 2:
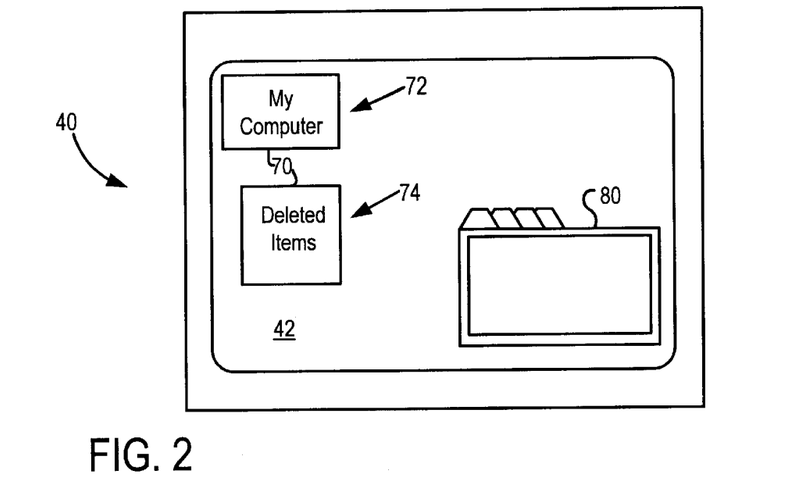
FIG. 2 shows a representative display screen illustrating screen objects and a viewport display area of a graphical user interface made according to the invention.

Referring to FIG. 2, the contents of the display screen 42 are described in more detail. Two windows 70 include icons for programs as is well known in the art. For example, one window 72 can be titled "My Computer", while another window 74 can be titled "Deleted Items". They are in the form of a rectangle, or other shape. The person skilled in the art will immediately realize that, while only two prior art windows are shown here, such is only by way of illustration. Such windows are well known in the art, and hence a more detailed description is not necessary.

As has been mentioned, the present invention provides a graphical user interface for managing a plurality of screen objects. In operation, the window based user interface of the present invention is generated and displayed as screen object 80 using software stored in memory 55 and executed by the CPU 52, as is known.

The interface of the invention includes means for creating a viewport. Display screen 42 also shows a viewport 80 displayed by a graphical user interface that is made according to the invention. It will be apparent that, as shown in FIG. 2, and also FIG. 3, viewport 80 is in its preferred embodiment which, however, is not limiting. The viewport can have other shapes, and features of it can be arranged differently.

Figure 3:
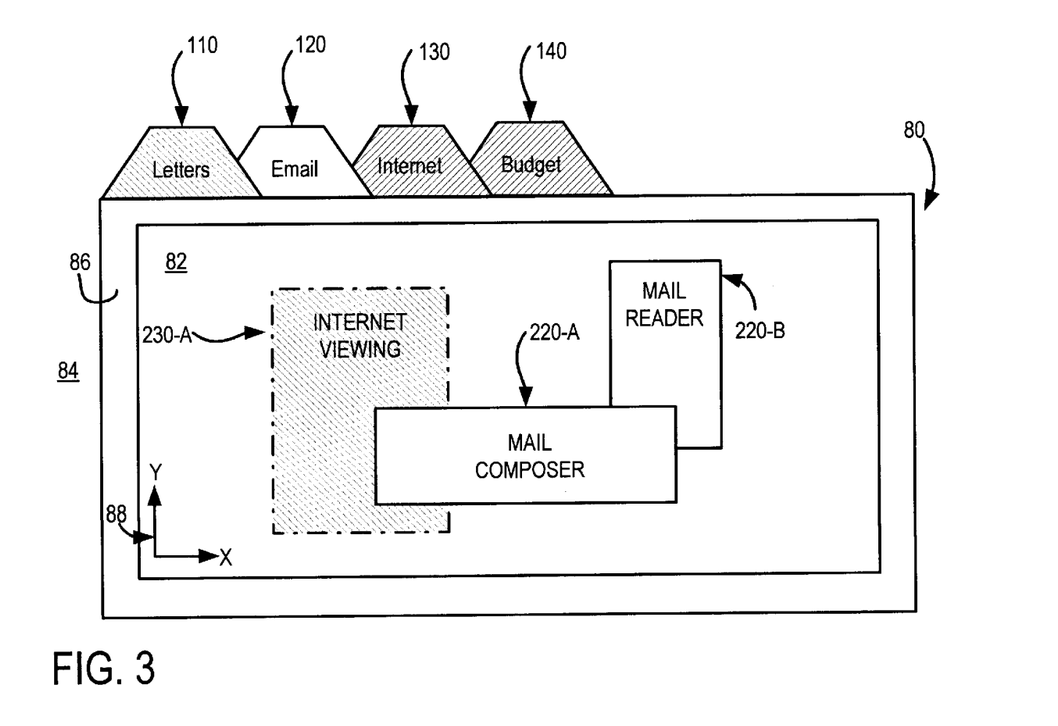
FIG. 3 illustrates a viewport display area of a graphical used interface made according to the invention, tabs for planes of the interface, and some screen objects placed in the interface.

Referring to FIG. 3, viewport 80 of the invention is discussed in more detail. The viewport establishes a viewport display area 82 in a first portion of the full area of screen 42. Display area 82 is for displaying the screen objects that are being managed by the interface of the invention. The interface thus also defines a non zero second portion 84 of the full area of the screen, which is outside viewport display area 82.

The user interface of the invention is made such that display area 82 can be sized and shaped by the user as is known in the art of screen windows. Also it can be moved around, relative to the full screen area 42.

Optionally and preferably a frame 86 surrounds viewport display area 82. The frame is preferably shown colored in a sharp color contrast from the background color of second portion 84. The frame is shown as rectangular, although that is not necessary.

Viewport 80 further includes four displayed tabs 110, 120, 130 and 140. The tabs are preferably shown outside display area 82, although that is not necessary.

The tabs are preferably shown arranged along a line. The tabs bear indicia, for example tab 120 is labeled "Email". The tabs are displayed graphically, and can be activated by moving the cursor to them, as with mouse 46, and clicking. Alternately, they can be activated by keyboard control, such as by reaching the desired one by using a "Tab" key of the keyboard and then hitting the "Enter" key.

Of those, tab 120 is highlighted, while the others are obscured in comparison. A closer inspection of the tabs as shown in FIG. 3 will reveal a detail in how tabs are shown obscured. The tab to the left of highlighted tab 120, i.e. tab 110, is shown obscured with left slanted hatching. Tabs to the right of tab 120, i.e. tabs 130, 140 are shown with right slanted hatching. The significance of this difference will be appreciated from the below.

Within display area 82 there can be any number of screen objects, as is known in the art. In the example of FIG. 3 three windows are shown, namely 220-A, 220-B and 230-A. They have indicia, such as labels, showing the intended use.

Of the three windows, the first two can be manipulated within display area 82 as is known in the art for screen windows. This includes running their software, or moving the displays around, including changing which one is shown obstructing the other. In the instant of FIG. 3, window 220-A (titled "Mail Composer") obstructs in part window 220-B (titled "Mail Reader"). However, the user can change this, such as by clicking the mouse on an exposed portion of window 220-B.

The third window 230-A (titled "Internet Viewing") is shown somewhat obscured, which is denoted with right slanted hatching. Another aspect of this window is that it can not be accessed for running, or for moving it around. So, to extend the metaphor, even though it appears within display area 82, where other work can be done, it is as if window 230-A is behind a glass cover of a desk. Another window can always be placed in front of it and obstruct it.

Figure 4:
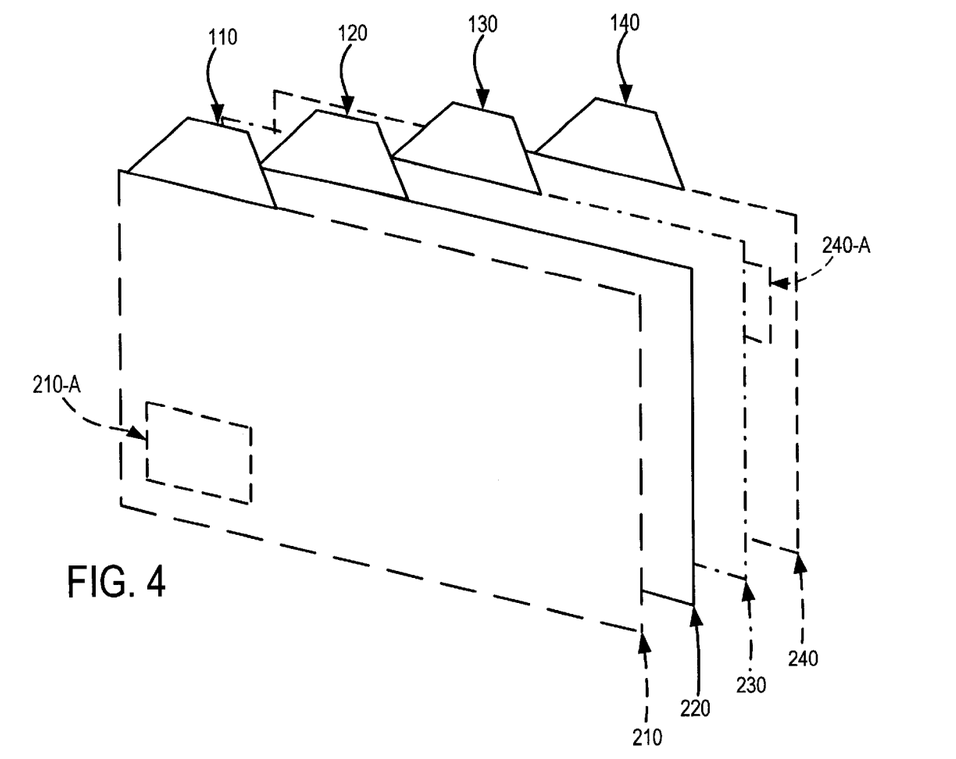
FIG. 4 illustrates planes of a graphical user interface in a sequence that could be considered in forming the display of FIG. 3.
Figure 5:
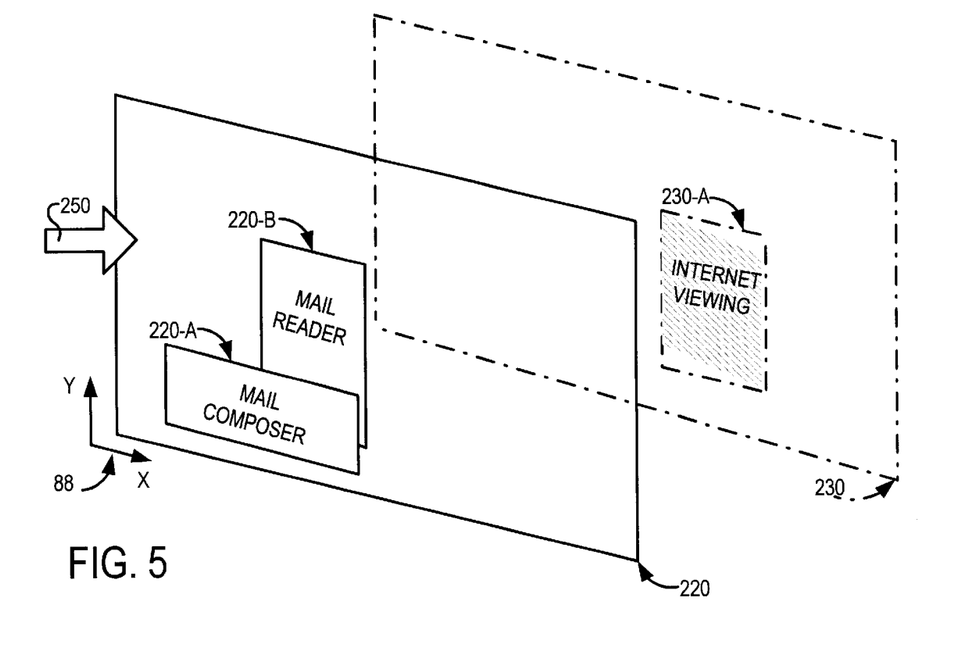
FIG. 5 is a detail of the two planes of FIG. 4 that are finally used to form the display of FIG. 3.

The workings of the interface of the invention are now described in more detail also with reference to FIGS. 4 and 5.

The user interface of the invention includes means for defining a plurality of data structures that are called planes. These planes are not really geometric planes, but simply a suitable metaphor for representing the data. Four such planes 210, 220, 230, 240 are seen graphically in FIG. 4.

The four tabs 110, 120, 130, 140 are also shown, and they correspond respectively to the planes. The tabs are shown attached to their respective planes, which is just a way to extend the metaphor for representing data. The appearance of the tabs can be customized. For example, names for the planes can be placed in the respective tabs.

The interface of the invention also includes means for adding and deleting planes. The planes are preferably considered in a sequence, as seen in FIG. 4. In addition, means are provided for changing the sequence. Each time this happens, the tabs become accordingly rearranged.

The sequence is best visualized as creating a stack perpendicularly to the area of each plane. This provides a sense of depth, which is a third dimension. Since human users already have developed a sense of depth, this metaphor capitalizes on a preexisting mental picture for making itself intuitive and teaching its use.

Each plane is a way of maintaining a group of screen objects. The interface of the invention also includes means for assigning each screen object to a specific one of the planes, such that at least two planes receive at least one object each. This can be accomplished as a software feature, as will be evident to a person having skill in the art of graphical user interfaces.

Referring back to FIG. 2, screen objects are typically found initially on a full area of a screen. Preferably they are brought into the interface by clicking the mouse on the object, and dragging the object onto the viewport display area. This assigns the object to one of the planes, preferably the one that is selected. This assignment removes the object from the rest of the desktop. Accordingly, screen objects found in the interface never appear outside the viewport display area.

More specifically, in FIG. 4, a screen object 210-A is shown assigned to plane 210. In addition, a screen object 240-A is shown assigned to plane 240, but it is not shown fully, because the other planes are considered opaque for the representation of FIG. 4.

Another feature of interest is that the screen objects are shown placed at specific locations of the planes. These locations are preferably chosen when the assigning means initially has placed the object at the viewport display area. It has done so at a place that is analyzed as a set of coordinates of viewport display area 82. The coordinates are in terms of a coordinate axis system 88 (the axes are not shown in the screen). The same coordinates are maintained for locating the screen object on the plane.

The invention further includes means for selecting a plane. Preferably, selecting automatically deselects all prior selections, and only one plane is selected at a time. The preferred means for selecting is by including means for displaying an identifying tab for each plane, and means for activating the tab corresponding to the plane that is desired to be selected. For example, and as was also described above, in the preferred embodiment, each of tabs 110, 120, 130 140, as seen in FIG. 3, is activated by pointing on it with the mouse and clicking. Alternately, using the tab key can highlight choices, until the "Enter" key is hit to confirm the highlighted choice.

An important advantage of the present invention is that it can access any one of the planes, regardless of how much deeper it is with respect to the selected plane. Such access can be with one click, because in the preferred embodiment, all tabs are always displayed.

The interface of the invention further includes means for displaying the tab corresponding to the selected plane more prominently than the other tabs. For example, referring to FIG. 3, and as also described above, tab 120 that is also labeled "Email" is highlighted. Referring to FIG. 4, this means that plane 220, which corresponds with highlighted tab 120 is selected. That is why plane 220 is shown with a solid line boundary, whereas the other planes are not.

The sense of depth is further enhanced by the aligning of the tabs. Tabs to the left of tab 120 are for planes "above" the selected plane, while tabs to the right of tab 120 are for planes located "deeper" than the selected plane. This sense is further created by an optional differential highlighting of the tabs for planes above (left slanted) versus for those for planes below (right slanted) the selected plane.

The interface of the invention further includes means for displaying in viewport display area 82 at least one of the objects assigned to selected plane 220. The displaying means (such as a driver) displays each object at the respective coordinates where the object has been placed.

The interface of the invention preferably also includes means for displaying at least one other object of a second plane. The second such plane is preferably the one next to selected plane 220 in the sequence, i.e., plane 230. That is why that plane is shown in dot-dashed lines, instead of just dashed lines as the remaining planes 210, 240.

Constructing this display is now explained with reference to FIGS. 4 and 5. First, from FIG. 4, unselected planes 210 and 240 are discarded, and so are their respective objects 210-A and 240-A. These discarded objects will not be visible for as long as plane 220 is selected.

Referring next to FIG. 5, selected plane 220 and the next plane 230 are illustrated, with the screen objects assigned to them, and also the relative locations of these objects. Contrary to the representation of FIG. 4, the planes of FIG. 5 are considered transparent, for purposes of forming the display. As seen above, plane 220 has two screen objects 220-A, 220-B assigned to it, and plane 230 has only one object 230-A.

The final display is constructed by looking at these two planes 220, 230 from the direction of arrow 250. The three objects come together, by preserving their locations and appearances within their respective planes, which preserves their relative coordinates and appearances on the screen relative to coordinate axes 88. The final display arises by superimposing the combination of objects 220-A and 220-B on 230-A, and is seen in FIG. 3, within area 82.

Another feature of the invention is that object 230-A of plane 230 can not be activated or manipulated, even though it is being displayed. Clicking the mouse on it does not move it or change its appearance. Object 230-A behaves like a piece of paper that is under a glass cover of a desk. It can be seen, covered, but not changed. Showing it, however, creates a desirable sense of depth.

To enhance the sense of depth, it is desired to indicate to the user of the interface the secondary status of object 230-A. Accordingly, a preferred feature of this invention is to include means for displaying object 230-A of second plane 230 less prominently than objects 220-A and 220-B belonging in first plane 220. This is signified in FIGS. 3 and 5 by hatching of object 230-A. Less prominently is accomplished in a number of ways, such as by illuminating its icon less. In addition, all objects of plane 230 are obscured by any one of the objects of plane 220, and can not be brought to the top by clicking on it.

The interface has means for moving object 220-A around viewport display area 82, thereby changing its coordinates with respect to axes 88. Further, the interface of the invention has means for unassigning an object from a plane, in order to assign it to another plane, or to remove it entirely from the interface.

In the preferred embodiment, all of the objects assigned to the selected plane are displayed in viewport display area 82. Other embodiments are also possible, where area 82 is made small enough that some objects are placed in virtual space, as will be obvious.

Figure 6:
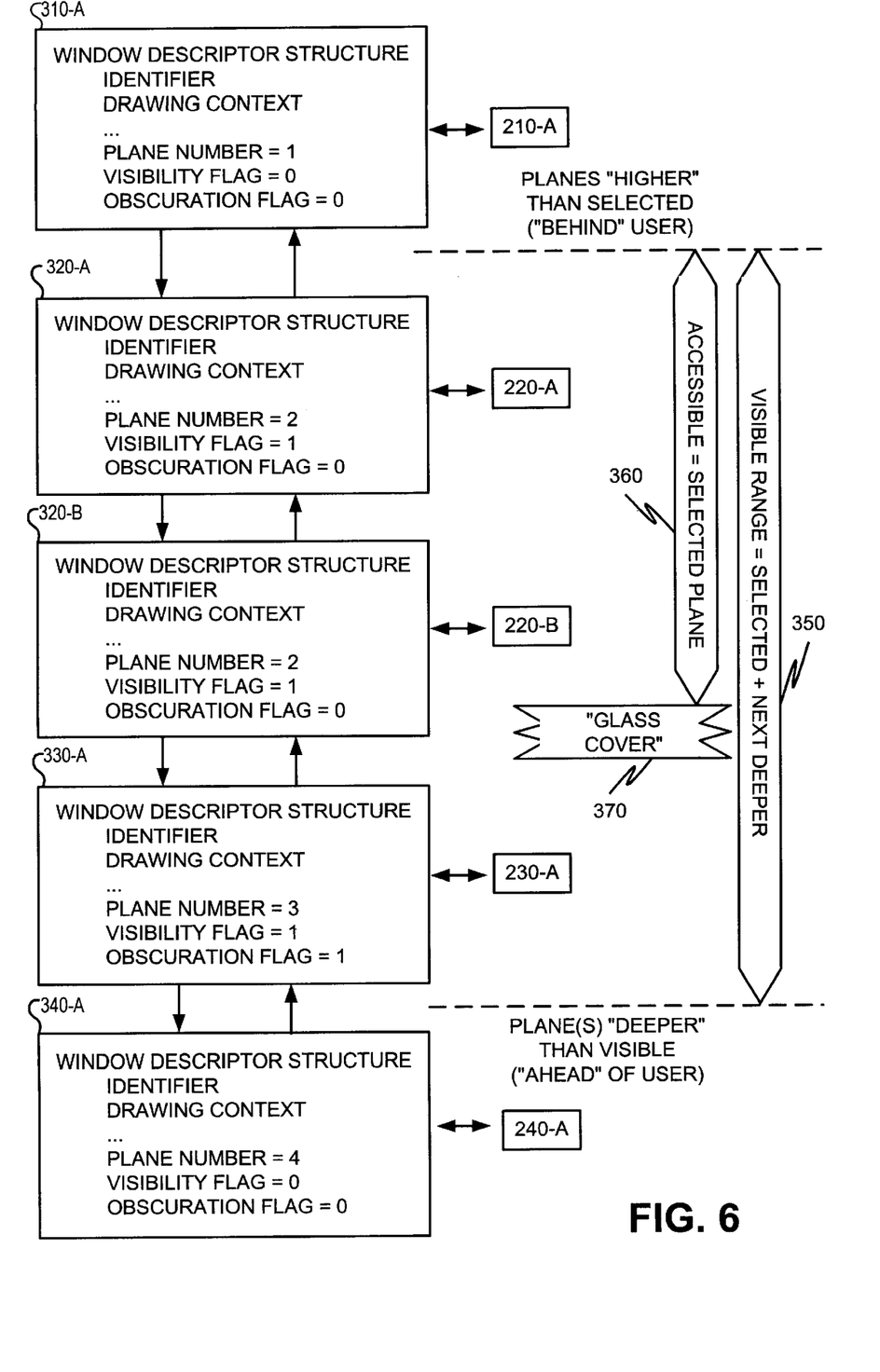
FIG. 6 is a diagram of a sample data structure for implementing the graphical user interface of the present invention, in parallel with a box representation of the screen objects that have been placed in the interface, and their attributes while in the interface.

Referring to FIG. 6, a sample data structure is now described for implementing the graphical user interface of the present invention. The person skilled in the art will appreciate that many such data structures are possible. In addition, other representations are shown in cooperation with the data structure to further facilitate visualizing the interface of the invention.

The particular data structure of FIG. 6 is for the screen objects of FIGS. 4 and 5 as an example only, although it will be appreciated that other such data structures are possible. Each screen object 210-A, 220-A, 220-B, 230-A, 240-A is assigned respectively a group of data 310-A, 320-A, 320-B, 330-A, 340-A, respectively.

Each group of data can be a window descriptor structure, which is used in creating the display. Each of these has at least a field for the identifier (tab), and for the drawing context (where and how located). Further, it should be correlated with the position of the viewport relative to the full screen area.

Each window descriptor structure moreover has a field for the plane number, which is the serial number of the plane in the sequence of the planes. In the example of this document, the sequence includes four planes (210, 220, 230, 240), and that is how the interface also numbers the planes. The selected plane is 220, which is the second in the sequence.

Additionally, the window descriptor structure includes a visibility flag. This is adjusted to be 1 if the object is the selected plane or the plane next to it, and 0 otherwise. In this example the selected plane is the second (number 2) in the sequence of four. The objects with a visibility flag of 0 are not displayed.

Furthermore, the window descriptor structure includes an obscuration flag. This is set to 0 (no obscuration applied), except for the objects of the plane next to the one selected. This means the flag will be set to 1 for the objects with plane number 3. When the flag is 1, the object is displayed less prominently than others, and obscured by them, as is object 230-A in FIG. 3.

To the right of each data structure box 310-A, 320-A, 320-B, 330-A, 340-A is a box representation of the corresponding screen object 210-A, 220-A, 220-B, 230-A, 240-A. In addition, these are lined up, which creates the sense of depth. The visible range 350 spans the objects in the selected plane (number 2), and the one in the immediately deeper plane (number 3). Of those, the objects in the selected plane are accessible 360 for moving and/or working on, whereas those in the deeper plane are only visible, as if through a glass cover 370.

Objects in planes "higher" or "deeper" than the visible range are not displayed at all. They can be accessed by changing the selected plane, which changes what is visible and what is accessible.

A number of users feel personally present in the screen they are working on. Such users will get a sense that planes that are deeper in the sequence than the selected plane are "ahead" of them, plus they can even see the first one through glass cover 370. Furthermore, planes that are above the selected one will feel "behind" the user.

As such, a user looking at the screen of FIG. 2 will mentally separate the screen in two parts. The part outside the viewport of the invention will feel two dimensional, flat. The part within the viewport display area will feel that it has depth, and can include many more items for the screen surface it commands.

The interface can be changed from what is described. For example, it can be made to display without making accessible more than one of the planes deeper than the selected plane.

Figure 7:
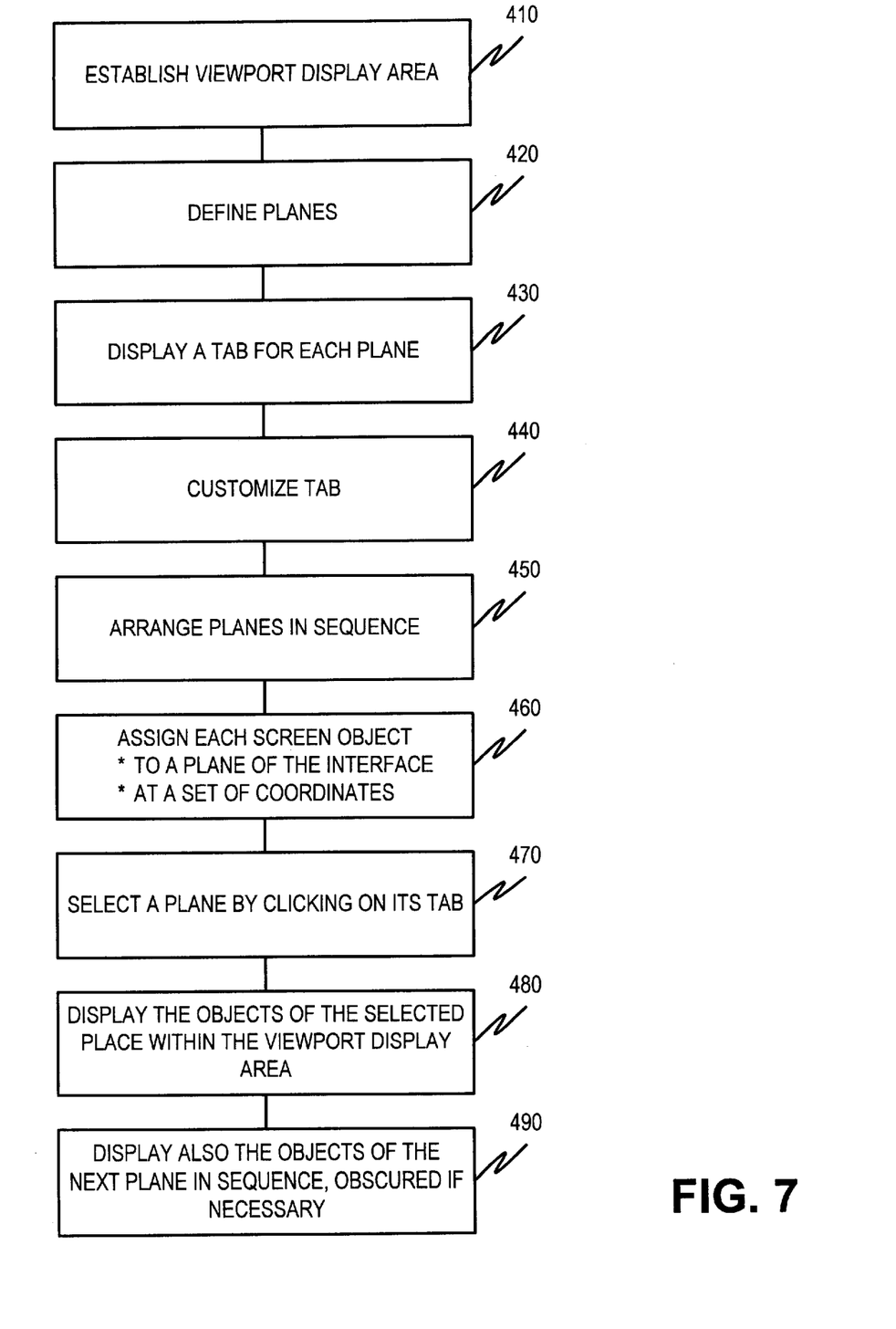
FIG. 7 is a flowchart illustrating steps for performing a method according to the invention.

FIG. 7 is a flowchart illustrating steps for performing a method according to the invention. The method is for using a graphical interface for managing a plurality of screen objects found on a full area of a screen, and is described also with reference to FIGS. 1–6 and their attendant description.

As a first step 410, a viewport display area 82 is established in a first portion of the full area of screen 42. This defines a non zero second portion of the full area of the screen outside the viewport display area. In addition, the methods of the invention includes steps such as resizing or reshaping the viewport display area, or moving it around within the full area of screen 42.

Next, as step 420, a plurality of planes is defined. A plane can be deleted after it is defined. Then (step 430), a tab is displayed for each plane. The tab can be customized (step 440).

The planes are preferably arranged in a sequence (step 450) that can be changed. The tabs appear in a linear sequence that reflects the sequence of the planes.

Then, according to step 460, each screen object is assigned to a specific one of the planes. This places the object within the management of the interface, and thus prevents it from being displayed in the second portion of the full area of the screen that is outside viewport display area 82.

Assignments can be such that at least two planes receive at least one object each. Once assigned, the object can be unassigned from a plane and assigned to a different plane. This can be accomplished by selecting the original plane of the object, then dragging the object out of the plane, then selecting the new plane, then reinserting the object in the new plane. Other methods can be implemented, that do not necessitate temporarily removing the object from the interface. For example, by using the mouse, an object may be selected, dragged over the tab of a new plane (thus selecting the plane), and then dragged to a position within the new plane.

Upon assignment, each object is also automatically assigned to a location of the plane that corresponds to x-y coordinates of viewport display area 82. That location can be changed by clicking on the object with the mouse, and dragging it within viewport display area 82.

Then, according to step 470, any one of the planes is selected. Preferably, that is accomplished by pointing and clicking on the tab of the plane that is desired to be selected. This preferably deselects all prior selections. As such, only one plane is selected at a time.

Next, according to step 480, the objects of the selected plane are displayed within area 82. Preferably the interface does this automatically after a new plane is selected. In any event, at least one object is preferably selected. If the viewport display area is manipulated to be wide enough, all the objects will be viewable. The objects are displayed at the coordinates of area 82 where they were assigned. All such displayed objects of the selected plane are selectable, e.g. by pointing and clicking.

In addition, upon selection of a plane the tab corresponding to the selected plane is displayed more prominently than the other tabs.

In addition, according to step 490, there is displayed at least one other object of a second plane. Preferably the second plane is the next one in the sequence of planes. Preferably it is displayed less prominently than objects belonging in the first plane, obscured by them, and in any event it is not activatable.

It will be appreciated that a number of extensions are possible, even though not necessarily preferred. First, each of the planes can be larger than the display area of the viewport. In turn, the display area of the viewport will be viewing only a portion of the selected plane, and can be manipulated to view another portion.

A person skilled in the art will be able to practice the present invention in view of the present description, where numerous details have been set forth in order to provide a more thorough understanding of the invention. In other instances, well-known features have not been described in detail in order not to obscure unnecessarily the invention. As the person will appreciate, many of the features described as means for plus function can be accomplished as software features. In addition, the method steps can be performed equivalently in different possible orders.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. Applicant regards the subject matter of the invention to include all combinations and subcombinations of the various elements, features, functions and/or properties disclosed herein. No single feature, function, element or property of the disclosed embodiments is essential. The following claims define certain combinations and subcombinations, which are regarded as novel and non-obvious. Additional claims for other combinations and subcombinations of features, functions, elements and/or properties may be presented in this or a related application for patent. Such additional claims are also regarded as included within the subject matter of applicant's invention irrespectively of whether they are broader, narrower, or equal in scope to the original claims.

The invention claimed is:

1. A graphical user interface for managing a plurality of screen objects found on a full area of a screen comprising:

means for establishing a viewport display area in a first portion of the full area of the screen, thereby defining a non zero second portion of the full area of the screen outside the viewport display area;

means for defining a plurality of planes;

means for assigning each object to a specific one of the planes, such that at least two planes are assigned at least one object each;

means for selecting any one of the planes; and means for displaying in the viewport display area at least one of the objects assigned to the selected plane, wherein none of the objects assigned to a plane can be displayed in the second portion of the full area of the screen wherein the means for selecting any one of the planes includes:

means for displaying an identifying tab for each plane; and means for activating the tab corresponding to the plane that is desired to be selected.

2. The interface of claim 1, further comprising means for changing a size of the viewport display area.

3. The interface of claim 1, further comprising means for changing a location of the viewport display area relative to the full area of the screen.

4. The interface of claim 1, wherein all of the objects assigned to the selected plane are displayed in the viewport display area.

5. The interface of claim 1, further comprising:

means for placing each object at a set of coordinates of the viewport display area, wherein the displaying means displays each object at the coordinates that the object has been placed.

6. The interface of claim 5, further comprising means for changing the coordinates in the viewport display area where the object is displayed.

7. The interface of claim 1, further comprising means for unassigning an object from a plane.

8. The interface of claim 1, further comprising means for deleting one of the defined planes.

9. The interface of claim 1, further comprising means for arranging the planes according to a sequence.

10. The interface of claim 9, further comprising means for changing the sequence.

11. The interface of claim 1, wherein the means for selecting any one of the planes deselects all other planes.

12. The interface of claim 1, further including means for customizing an appearance of the tab.

13. The interface of claim 1, further including means for displaying the tab corresponding to the selected plane more prominently than the other tabs.

14. The interface of claim 1, further comprising means for displaying at least one other object of a second plane.

15. The interface of claim 14, wherein the planes are arranged in a sequence, and the second plane is the plane immediately after the selected plane in the sequence.

16. The interface of claim 14, wherein the means for displaying the object of the second plane displays the second object less prominently than the object belonging in the first plane.

17. The interface of claim 14, wherein the means for displaying the object of the second plane displays the second object obscured at least in part by the object belonging in the first plane.

18. The interface of claim 14, wherein the displayed object of the selected plane can be activated directly by a pointing device, while the displayed second object can not be similarly activated.

19. A method of using a graphical interface for managing a plurality of screen objects found on a full area of a screen comprising:

establishing a viewport display area in a first portion of the full area of the screen, thereby defining a non zero second portion of the full area of the screen outside the viewport display area;

defining a plurality of planes;

assigning each object to a specific one of the planes, such that at least two planes are assigned at least one object each;

selecting any one of the planes; and displaying in the viewport display area at least one of the objects assigned to the selected plane, while preventing all of the objects assigned to a plane from being displayed in the second portion of the full area of the screen wherein selecting any one of the planes includes:

displaying an identifying tab for each plane; and activating the tab corresponding to the plane that is desired to be selected.

20. The method of claim 19, further comprising changing a size of the viewport display area.

21. The method of claim 19, further comprising changing a location of the viewport display area relative to a full area of the screen.

22. The method of claim 19, wherein all of the objects assigned to the selected plane are displayed in the viewport display area.

23. The method of claim 19, further comprising:

placing each object at a set of coordinates of the viewport display area, wherein the displaying step displays each object at the coordinates that the object has been placed.

24. The method of claim 23, further comprising changing the coordinates in the viewport display area where the object is displayed.

25. The method of claim 19, further comprising unassigning an object from a plane.

26. The method of claim 19, further comprising deleting one of the defined planes.

27. The method of claim 19, further comprising arranging the planes according to a sequence.

28. The method of claim 27, further comprising changing the sequence.

29. The method of claim 19, wherein selecting any one of the planes deselects all other planes.

30. The method of claim 20, further including customizing an appearance of the tab.

31. The method of claim 19, further including displaying the tab corresponding to the selected plane more prominently than the other tabs.

32. The method of claim 19, further comprising:

selecting an object assigned to the selected plane; and moving the selected object over the identifying tab of a second plane distinct from the selected plane, thereby unassigning the object from the selected plane and assigning the object to the second plane.

33. The method of claim 19, further comprising displaying at least one other object of a second plane.

34. The method of claim 33, further comprising arranging the planes according to a sequence, and wherein the second plane is the plane immediately after the selected plane in the sequence.

35. The method of claim 33, wherein the object of the second plane is displayed less prominently than the object belonging in the first plane.

36. The method of claim 33, wherein the object of the second plane is displayed obscured at least in part by the object belonging in the first plane.

37. The method of claim 33, wherein the displayed first object of the selected plane can be activated while the displayed second object can not be activated.

\* \* \* \* \*